(12) United States Patent
Kogawa et al.

(10) Patent No.: US 9,941,914 B2
(45) Date of Patent: Apr. 10, 2018

(54) RECEIVING DEVICE, COMMUNICATION SYSTEM, AND INTERFERENCE DETECTION METHOD

(71) Applicant: KABUSHIKI KAISHA TOSHIBA, Minato-ku, Tokyo (JP)

(72) Inventors: Tsuyoshi Kogawa, Kawasaki Kanagawa (JP); Tomoya Tandai, Ota Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 94 days.

(21) Appl. No.: 14/968,413

(22) Filed: Dec. 14, 2015

(65) Prior Publication Data
US 2016/0173151 A1 Jun. 16, 2016

(30) Foreign Application Priority Data
Dec. 16, 2014 (JP) .................. 2014-254590

(51) Int. Cl.
H04J 3/06 (2006.01)
H04B 1/10 (2006.01)
H04B 17/345 (2015.01)

(52) U.S. Cl.
CPC ......... H04B 1/1027 (2013.01); H04B 17/345 (2015.01)

(58) Field of Classification Search
CPC ............................ H04B 1/1027; H04B 17/345
USPC .......... 370/328–355, 501–509; 375/345–365
See application file for complete search history.

(56) References Cited

U.S. PATENT DOCUMENTS

| | | | | |
|---|---|---|---|---|
| 6,108,352 A * | 8/2000 | Sferrazza | ............ | H04L 12/4135 370/503 |
| 6,177,835 B1 * | 1/2001 | Grebowsky | ......... | H04L 27/2332 329/304 |
| 6,714,529 B1 * | 3/2004 | Tanabe | .................. | G01L 3/1478 370/343 |
| 6,882,604 B2 * | 4/2005 | Patapoutian | ............. | G11B 5/09 360/78.06 |
| 7,233,632 B1 * | 6/2007 | Kingston | .............. | H04L 7/0054 329/307 |
| 7,526,053 B1 * | 4/2009 | Sallaway | ................. | H04B 3/23 375/341 |
| 8,121,714 B2 * | 2/2012 | Yamashita | ............ | G10L 19/008 700/94 |
| 8,891,714 B2 * | 11/2014 | Raman | .................... | G01S 19/24 375/354 |

(Continued)

FOREIGN PATENT DOCUMENTS

| JP | 04008032 A | 1/1992 |
|---|---|---|
| JP | 2006203410 A | 8/2006 |

OTHER PUBLICATIONS

"Amendment 3: Enhancements for Very High Throughput in the 60 GHz Band", IEEE802.11ad; Dec. 28, 2012.

*Primary Examiner* — Man Phan
(74) *Attorney, Agent, or Firm* — Holtz, Holtz & Volek PC

(57) ABSTRACT

A receiving device of an embodiment has a receiver, a demultiplexer, and an interference detector. The receiver receives a multiplexed signal. The demultiplexer demultiplexes the multiplexed signal into a plurality of signals. The interference detector, with referring to bit transitions of the plurality of signals in a predetermined time period, detects interference in the multiplexed signal.

7 Claims, 17 Drawing Sheets

(56) References Cited

U.S. PATENT DOCUMENTS 9,001,724 B2 * 4/2015 Nakano ................ H04J 11/0033
370/238
9,628,123 B2 * 4/2017 Farrugia ............. H03M 1/0836

* cited by examiner

RECEIVING DEVICE, COMMUNICATION SYSTEM, AND INTERFERENCE DETECTION METHOD

CROSS-REFERENCE TO RELATED APPLICATION

This application is based upon and claims the benefit of priority from Japanese Patent Application No. 2014-254590, filed Dec. 16, 2014; the entire contents of which are incorporated herein by reference.

Embodiments of the present invention relate to a receiving device, a communication system, and an interference detection method.

BACKGROUND

In a receiving device, deterioration of communication quality of a desired signal caused by an interfering or jamming signal, and deterioration of communication quality of a desired signal caused by deterioration of the communication transmission path hinder normal reception. Duplication of the transmission path and comparison of the two information received in duplicate using the result to detect abnormalities has been proposed as a method of detecting the deterioration of communication quality.

However, in a method such as this, it is necessary to have a duplicated transmission path, thereby increasing the overhead, and there have been cases in which the transmission efficiency was poor.

EMBODIMENTS

Figure 1:
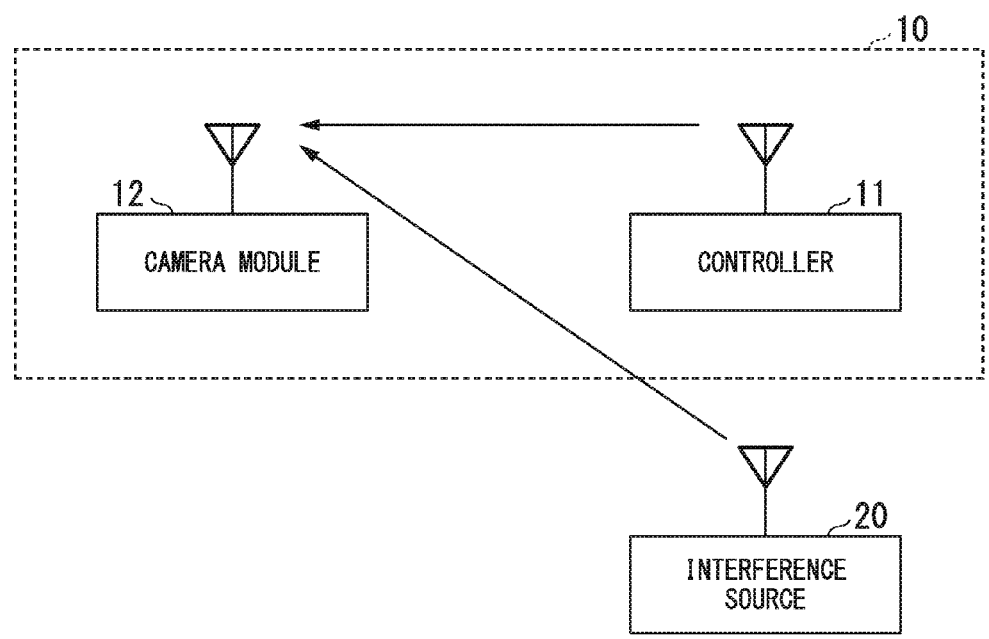
FIG. 1 is a conceptual view showing the constitution of a communication system 10 of the first embodiment.

In some embodiments, a receiving device may include, but is not limited to, a receiver to receive a multiplexed signal; a demultiplexer to demultiplex the multiplexed signal into a plurality of signals; and an interference detector to, with referring to transitions in bit of the plurality of signals in a predetermined time period, detect interference in the multiplexed signal.

In other embodiments, the interference detector determines that interference is detected when the transition in bit has been caused in at least one of demultiplexed signals within the predetermined time period after the transition in bit previously occurred in the demultiplexed signal.

In other embodiments, the interference detector detects interference with referring to a frequency-of-occurrence of transitions in bit of any signal of demultiplexed signals within the predetermined time period after the transition in bit previously occurred in the demultiplexed signal.

In other embodiments, the interference detector detects interference with referring to a frequency-of-occurrence of transitions in bit of any signal of the plurality of signals.

In other embodiments, the interference detector determines that interference is detected in a case that a first amount of time during which the frequency-of-occurrence remains at least a threshold exceeds a shortest frame length in a predetermined protocol.

In other embodiments, the interference detector determines that interference is detected in cases that the first amount of time during which the frequency-of-occurrence remains at least a threshold exceeds the shortest frame length and that the first amount of time is less than or equal to a longest frame length in the predetermined protocol, and that a second amount of time during which the frequency-of-occurrence remains less than the threshold follows the first amount of time, the second amount of time is at least the no-signal time period after a frame in the predetermined protocol.

In other embodiments, the plurality of signals includes a known signal. The interference detector determines that interference is detected, based on not only the transitions in bit, but also the frequency-of-occurrence that the known signal is different in value from known values.

In other embodiments, the plurality of signals includes a first synchronization information. The interference detector determines whether or not the first synchronization information is the same as a second synchronization information generated by the receiving device. The interference detector determines that the transition in bit has occurred, in a case that the interference detector determines the result of the determination of the current time is different from the determination result of the previous time.

In some embodiments, a communication system may include, but is not limited to, a transmitting device that transmits a multiplexed signal; and a receiving device that receives the multiplexed signal transmitted by the transmitter. The receiving device may include, but is not limited to, a receiver to receive the multiplexed signal transmitted by the transmitting device; a demultiplexer to demultiplex the multiplexed signal into a plurality of signals; and an interference detector to, with referring to transitions in bit of the plurality of signals in a predetermined time period, detect interference in the multiplexed signal.

In some embodiments, an interference detection method may include, but is not limited to, receiving a multiplexed signal; demultiplexing the multiplexed signal into a plurality of signals; and detecting interference in the multiplexed signal with referring to transitions in bit of the plurality of signals in a predetermined time period.

A receiving device, a communication system, and an interference detection method of embodiments will be described below, with references made to the drawings.

First Embodiment

FIG. 1 is a conceptual view showing the constitution of the communication system 10 of the first embodiment. The communication system 10 includes a controller 11 (transmitting device) and a camera module 12 (receiving device). To control the camera module 12, the controller 11 sends a plurality of control information to the camera module 12 by a wireless signal. The interference source 20 is, for example, communicating wirelessly with another, non-illustrated, device. The wireless signal transmitted by the interference source 20 acts as an interfering signal with respect to the wireless signal transmitted by the controller 11.

As shown in FIG. 1, if the distance between the camera module 12 and the interference source 20 is short, the camera module 12 is influenced by the interfering signal and might not be able to receive the control information correctly. As a result, there is a possibility that the desired operation of the camera module 12 will be hindered. Given this, it is desirable that the camera module 12 detect the interfering signal and perform control so as to avoid the interference as the communication system 10. The detection of interference that is required in order to perform control to avoid interference in the present embodiment will be described in detail. As control to avoid interference, it is possible to adopt existing control methods, such as control of the antenna directivity of the controller 11 or the camera module 12, reduction of the influence of interference by signal processing, changing of the channel (frequency) to be used, or increasing the transmitted power. The communication system 10 may have a control function that avoids interference, such as a control function that discards a signal that is interference with, or another control function.

Although the present embodiment is an example for the case in which a wireless signal is transmitted from the controller 11 to the camera module 12 and in which that wireless signal is affected by interference, this is not a restriction. For example, the controller 11 and the camera module 12 may be connected by cable and the cable signal transmitted by that cable connection may be affected by an interfering signal, or the controller 11 and the camera module 12 may be installed in the same enclosure and connected by a cable. In these cases, the interfering signal causes deterioration of the communication quality by the influence of deterioration of the cable or other transmission path influences.

Figure 2:
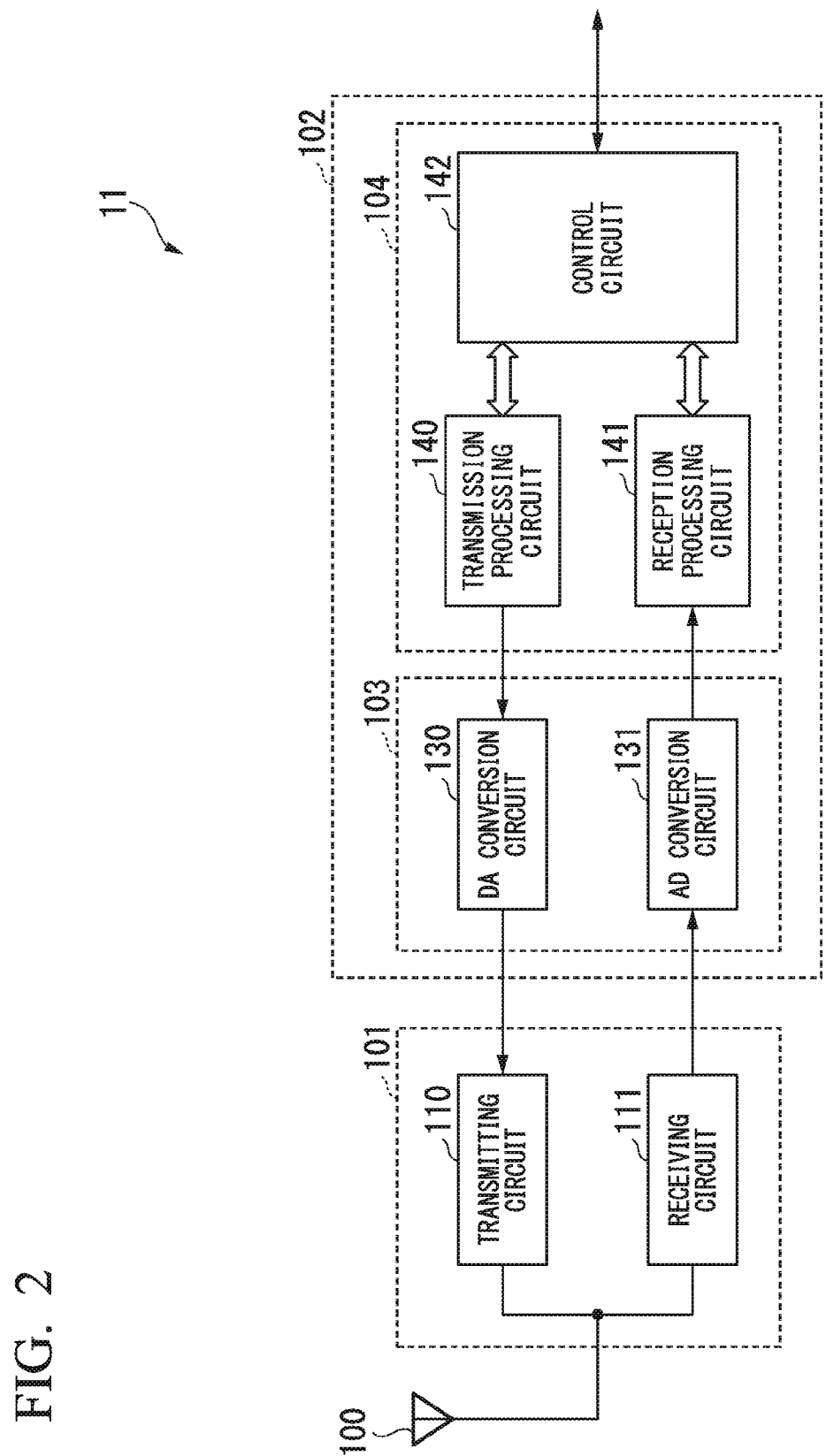
FIG. 2 is a simplified block diagram showing an example of the hardware constitution of a wireless communication device installed in a controller of the first embodiment.

FIG. 2 shows an example of the hardware constitution of a wireless communication device mounted in the controller 11. This is one example of the constitution, and the present embodiment is not restricted thereto. The wireless communication device that is installed in the controller 11 communicates wirelessly with the camera module 12, and multiplexes and transmits a plurality of control information. The wireless communication device has an antenna 100, an RF (radio frequency) unit 101, and a baseband unit 102. The baseband unit 102 includes a DA conversion circuit 130, an AD conversion circuit 131, a transmission processing circuit 140, a reception processing circuit 141, and a control circuit (protocol stack) 142. The RF unit 101 and the baseband unit 102 may be implemented as a one-chip IC (integrated circuit).

The baseband unit 102, for example, can be a baseband LSI device or other baseband IC. An example is the baseband unit 102 being the baseband ICs 103 and 104. In this case, the IC 104 may include the control circuit 142, the transmission processing circuit 140, and the reception processing circuit 141, and the IC 103 may include the DA conversion circuit 130 and the AD conversion circuit 131.

The control circuit 142 in the baseband unit 102 performs processing of the MAC (media access control) layer or the like for the purpose of transmitting control information to the camera module 12. The control circuit 142 may include a clock generator. The transmission processing circuit 140 generates a frame by adding a preamble pattern and a PHY header to the data such as control information and the like to be transmitted to the camera module 12. The transmission processing circuit 140 performs processing for encoding and modulation or the like with respect to the generated frame to generate a digital baseband signal. If a quadrature modulation scheme such as BPSK (binary shift keying) or QPSK (quadrature phase shift keying) is used, two types of digital baseband signals (referred to hereafter at the digital I (in-phase) and digital Q (quad-phase) signals) are generated.

The DA conversion circuit 130 DA (digital-to-analog) converts the signal (digital baseband signal) input from the transmission processing circuit 140 to obtain an analog baseband signal.

If a quadrature modulation scheme is used, there are two DA conversion circuits 130, one converting the digital I signal to an analog I signal, and the other converting the digital Q signal to an analog Q signal.

The RF unit 101 is, for example, an RF analog IC or a high-frequency IC. The transmitting circuit 110 in the RF unit 101 wirelessly transmits the frame signal (analog baseband signal) DA-converted by the DA conversion circuit 130 via the antenna 100. The transmitting circuit 110 includes, for example, a transmitting filter that extracts from the frame signal DA-converted by the DA conversion circuit 130 a signal of a desired band, a mixer that uses a signal of a fixed frequency supplied by an oscillator to up-convert the filtered signal to a wireless frequency, and a pre-amp (PA) that amplifies the up-converted signal to obtain a wireless signal.

The receiving circuit 111 (receiver) in the RF unit 101 converts the signal received by the antenna 100 to an analog baseband signal. The receiving circuit 111 includes, for example, a low-noise amplifier that amplifies the signal received by the antenna 100, a mixer that uses a fixed frequency signal supplied by an oscillator to down-convert the amplified signal to the baseband, and a receiving filter that extracts a signal of the desired band from the down-converted signal to obtain the analog baseband signal. If a quadrature modulation scheme is used, the receiving circuit 111, the received signals that have been low-noise amplified by the non-illustrated low-noise amplifier are quadrature demodulated by carriers that are mutually phase-shifted by 90°, so as to generate the I signal that is in-phase with received signal and a Q signal that lags by 90°.

After gain adjustment of the I signal and the Q signal, they are output from the receiving circuit 111.

The control circuit 142 may control the operation of the transmitting filter of the transmitting circuit 110 and the receiving filtering of the receiving circuit 111. A separate control unit that controls the transmitting circuit 110 and the receiving circuit 111 may exist, and the control circuit 142 may issue instructions to that control unit so as to perform the same type of control.

The AD conversion circuit 131 in the baseband unit 102 analog-to-digital converts the input signal from the receiving circuit 111 (the analog baseband signal). If a quadrature modulation scheme is used, there are two AD conversion circuits 131, one converting the I signal to a digital I signal, and the other converting the Q signal to a digital Q signal. The reception processing circuit 141 performs demodulation processing of the AD-converted signal, processing to strip the preamble pattern and the PHY header therefrom, and then passes the processed frame to the control circuit 142. In the control circuit 142, processing such as processing to estimate the propagation path and processing to calculate the transmission weight and the reception weight may be performed.

A switch may be disposed in the RF unit 101 that switch selects either the transmitting circuit 110 or the receiving circuit 111. By controlling the switch, the antenna 100 may be connected to the transmitting circuit 110 when transmitting and connected to the receiving circuit 111 when receiving.

Although FIG. 2 shows the example in which a single antenna is connected to the transmitting circuit and the receiving circuit, two antennas, one a dedicated transmitting antenna, and the other a dedicated receiving antenna may be provided, in which case the dedicated transmitting antenna is connected to the transmitting circuit, and the dedicated receiving antenna is connected to the receiving circuit. This eliminates the need for the antenna switch and the need to control the switch. Although FIG. 2 shows the DA conversion circuit 130 and the AD conversion circuit 131 disposed in the baseband unit 102, they may be disposed in the RF unit 101. Also, if on-off keying (OK) is used as the modulation scheme, the DA conversion circuit 130 may output either high or low, depending upon the input from the transmission processing circuit 140, and rather than having the DA conversion circuit 130, the transmitting circuit 110 may have the DA conversion circuit 130, and the transmitting circuit 110 may output or stop the output of the transmitted signal, depending upon the input from the transmission processing circuit 140. If on-off keying is used as the modulation scheme, the AD conversion circuit 131 may be a I-bit converter.

Figure 3:
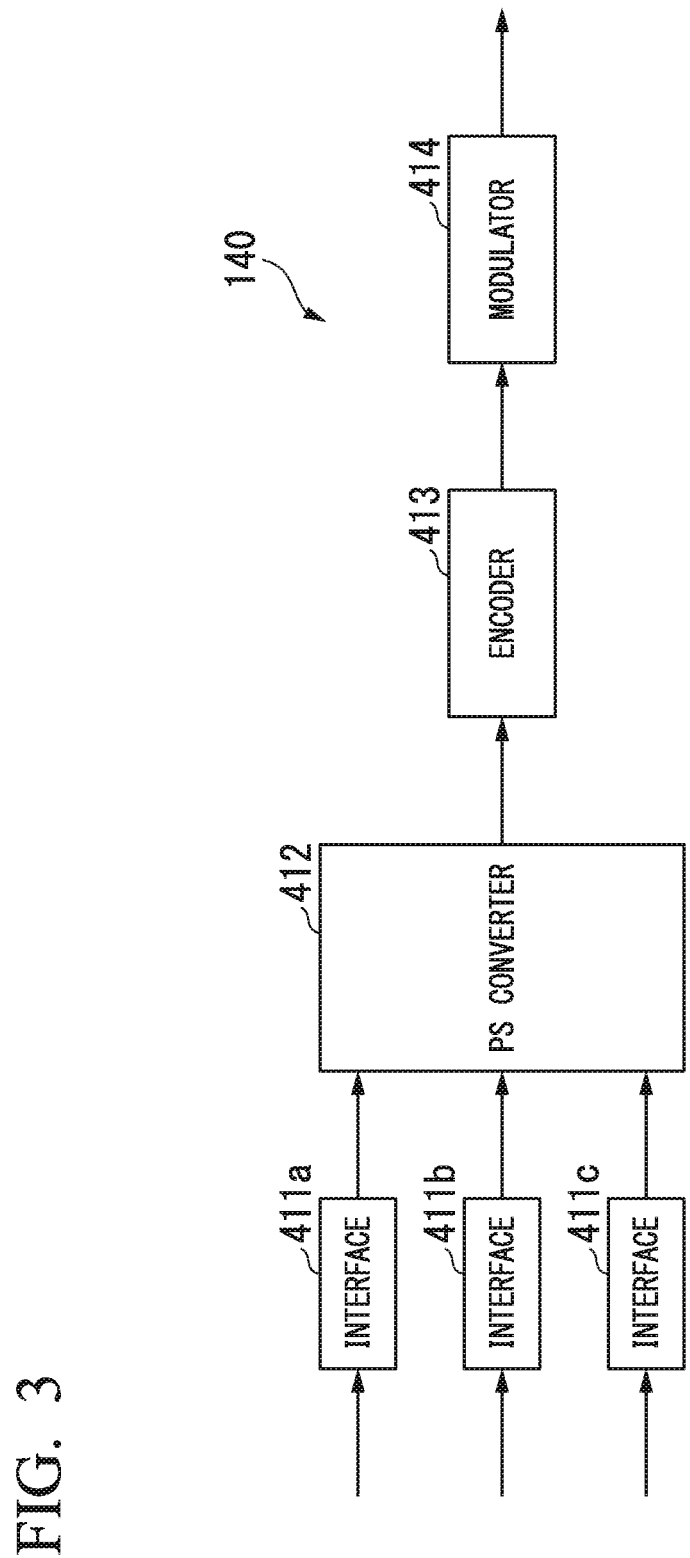
FIG. 3 is a simplified block diagram showing the constitution of a transmission processing circuit of the first embodiment.

FIG. 3 is a simplified block diagram showing the constitution of the transmission processing circuit 140. Although the example of the constitution shown in FIG. 3 is the case in which three control information are multiplexed, this is not a restriction. The control information that is multiplexed may be two information or four or more information. The transmission processing circuit 140 includes interfaces 411a, 411b, and 411c, a PS converter 412, an encoder 413, and a modulator 414. The interfaces 411a, 411b, and 411c are input interfaces for signals representing control information, for example, a zoom magnification control signal, a zoom reduction control signal, and a lens switching control signal from the control circuit 142. The zoom magnification control signal, the zoom reduction control signal, and the lens switching control signal are, as will be described later, bit stream signals that are 1 in the on state and 0 in the off state. The outputs of the interfaces 411a, 411b, and 411c are input to the PS converter 412.

The PS converter 412 converts parallel information input from the interfaces 411a, 411 b, and 411c to serial information, in accordance with a given rule. The conversion to this serial information multiplexes a plurality of control information. The given rule is common to the transmitting side and the receiving side. The serial information is input to the encoder 413.

The encoder 413 encodes the serial information input from the PS converter 412. The encoding used can be, for example, 8b/10b encoding that can be used in high-speed serial transfer. The encoder 413 inputs an encoded signal generated by the encoding to the modulator 414.

The modulator 414 modulates the encoded signal input from the encoder 413 and generates a digital baseband signal using, for example, on-off keying. The modulator 414 inputs the generated digital baseband signal to the DA conversion circuit 130.

Figure 4:
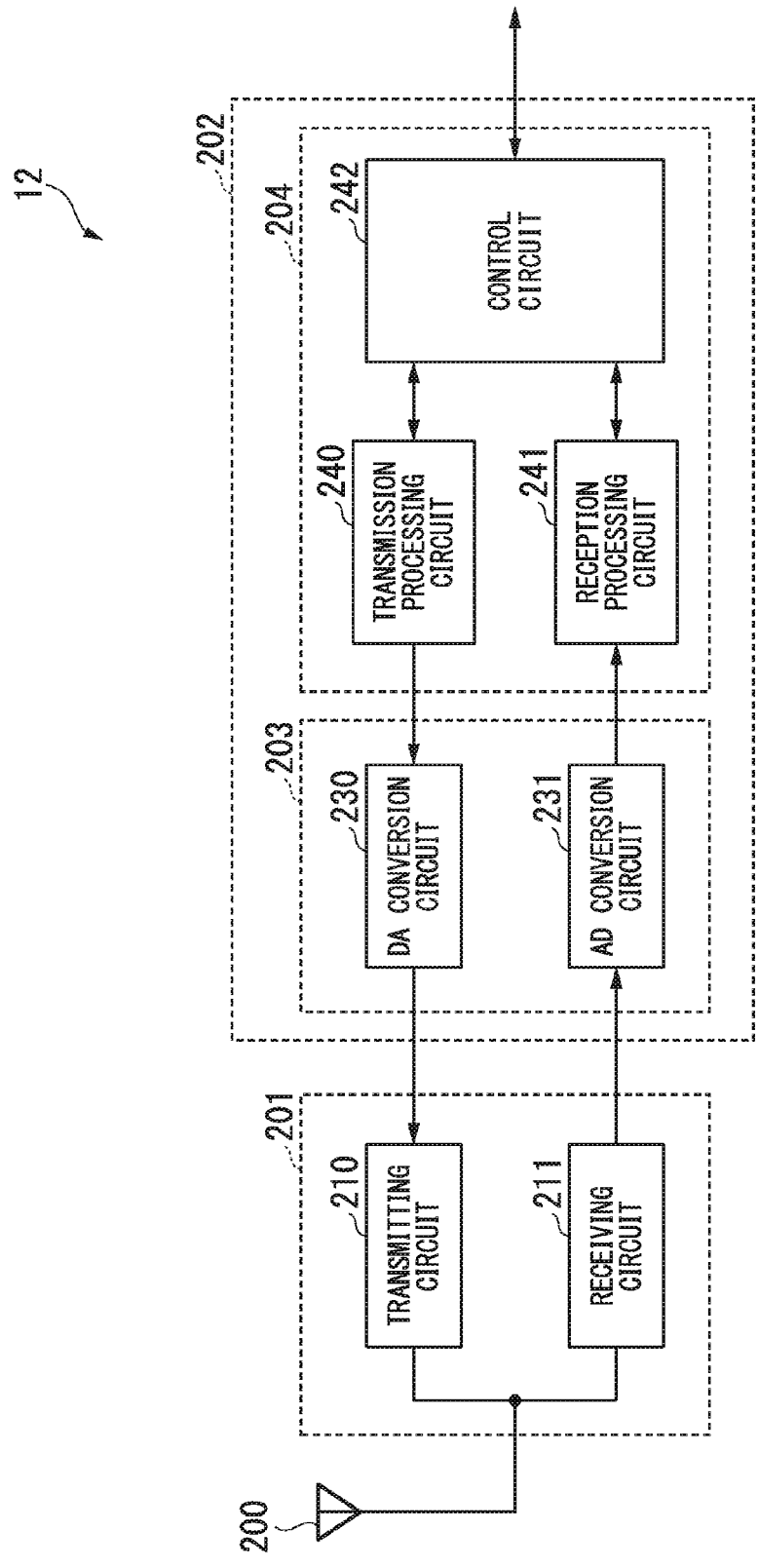
FIG. 4 is a simplified block diagram showing an example of the hardware constitution of a wireless communication device installed in a camera module of the first embodiment.

FIG. 4 shows an example of the hardware constitution of a wireless communication device installed into the camera module 12. This is one example of the constitution, and the present embodiment is not restricted thereto.

The wireless communication device installed in the camera module 12 has the same constitution as the wireless communication device installed in the controller 1. The wireless communication device installed in the camera module 12 communicates wirelessly with the controller 11 and receives a plurality of control information that have been multiplexed. When this is done, the wireless communication device detects interference. The wireless communication device includes an antenna 200, an RF unit 201, and a baseband unit 202. The baseband unit 202 includes a DA conversion circuit 230, an AD conversion circuit 231, a transmission processing circuit 240, a reception processing circuit 241, and a control circuit (protocol stack) 242. The RF unit 201 and the baseband unit 202 may be implemented as a one-chip IC.

The baseband unit 202, for example, can be a baseband LSI device or other baseband IC. An example is that the baseband unit 202 may have the baseband ICs 203 and 204. In this case, the IC 204 includes the control circuit 242, the transmission processing circuit 240, and the reception processing circuit 241, and the IC 203 includes the DA conversion circuit 230 and the AD conversion circuit 231.

The control circuit 242 in the baseband unit 202 performs processing of the MAC (media access control) layer or the like for the purpose of receiving control information from the controller 11. The control circuit 242 may include a clock generator. The transmission processing circuit 240 generates a frame by adding a preamble pattern and a PHY header to the data to be transmitted to the controller 11. The transmission processing circuit 240 performs processing for encoding and modulating the generated frame to generate a digital baseband signal. If a quadrature modulation scheme is used, two types of digital baseband signals (referred to hereinafter at the digital I and digital Q signals) are generated.

If the reception processing circuit 241 detects interference, the control circuit 242 performs controls to avoid the interference. For example, the control circuit 242 may notify an upper layer (not shown) of the detection of interference or notify the control circuit 142 of the controller 11 of the detection of interference, or may instruct the control circuit 142 of the controller 11 to perform control to avoid the interference. If the reception processing circuit 241 detects interference, the control circuit 242 may cause an LED (not shown) provided in the camera module 12 as a direct user notification to light.

The DA conversion circuit 230 digital-to-analog converts the signal input from the transmission processing circuit 240 (digital baseband signal) to obtain an analog baseband signal. If a quadrature modulation scheme is used, there are two DA conversion circuits 230, one converting the digital I signal to an analog I signal, and the other converting the digital Q signal to an analog Q signal.

The RF unit 201 is, for example, an RF analog IC or a high-frequency IC. The transmitting circuit 210 in the RF unit 201 wirelessly transmits the frame signal (analog baseband signal) converted to a wireless signal by DA conversion by the DA conversion circuit 230 and wirelessly transmitted via the antenna 200. The transmitting circuit 210 includes, for example, a transmitting filter that extracts from the frame signal that was DA converted by the DA conversion circuit 230 a signal of a desired band, a mixer that uses a signal of a fixed frequency supplied by an oscillator to up-convert the filtered signal to a wireless frequency, and a pre-amp (PA) that amplifies the up-converted signal to obtain a wireless signal.

The receiving circuit 211 (receiver) in the RF unit 201 converts the signal (a multiplexed signal) received by the antenna 200 to an analog baseband signal. The receiving circuit 211 includes, for example, a low-noise amplifier that amplifies the signal received by the antenna 200, a mixer that uses a fixed frequency signal supplied by an oscillator to down-convert the amplified signal to the baseband, and a receiving filter that extracts a signal of the desired band from the down-converted signal to obtain the analog baseband signal. If a quadrature modulation scheme is used, the receiving circuit 211 quadrate demodulates the received signals that have been low-noise amplified by the non-illustrated low-noise amplifier are quadrature demodulated by carriers that are mutually phase-shifted by 90°, so as to generate the I signal that is in-phase with received signal and a Q signal that lags by 90°.

After gain adjustment of the I signal and the Q signal, they are output from the receiving circuit 211.

The control circuit 242 may control the operation of the transmitting filter of the transmitting circuit 210 and the receiving filtering of the receiving circuit 211. A separate control unit that controls the transmitting circuit 210 and the receiving circuit 211 may exist, and the control circuit 242 may issue instructions to that control unit so as to perform the same type of control.

The AD conversion circuit 231 in the baseband unit 202 analog-to-digital converts the input signal from the receiving circuit 211 (the analog baseband signal). If a quadrature modulation scheme is used, there are two AD conversion circuits 231, one converting the I signal to a digital I signal, and the other converting the Q signal to a digital Q signal. The reception processing circuit 141 performs demodulation processing of the AD-converted signal, processing to strip the preamble pattern and the PHY header therefrom, and then separates the processed fame into a plurality of control information and passes them to the control circuit 142. The reception processing circuit 141 uses a plurality of separated control information signals to detect interference. This detection of interference will be described in detail. In the control circuit 242, processing such as processing to estimate the propagation path and processing to calculate the transmission weight and the reception weight may be performed.

A switch may be disposed in the RF 201 unit that switches an antenna 200 to either the transmitting circuit 210 or the receiving circuit 211. By controlling the switch, the antenna 200 may be connected to the transmitting circuit 210 when transmitting and connected to the receiving circuit 211 when receiving.

Although FIG. 4 shows the DA conversion circuit 230 and the AD conversion circuit 231 disposed in the baseband unit 202, they may be disposed in the RF unit 201. Also, if on-off keying (OOK) is used as the modulation scheme, the DA conversion circuit 230 and the AD conversion circuit 231 are not required.

Figure 5:
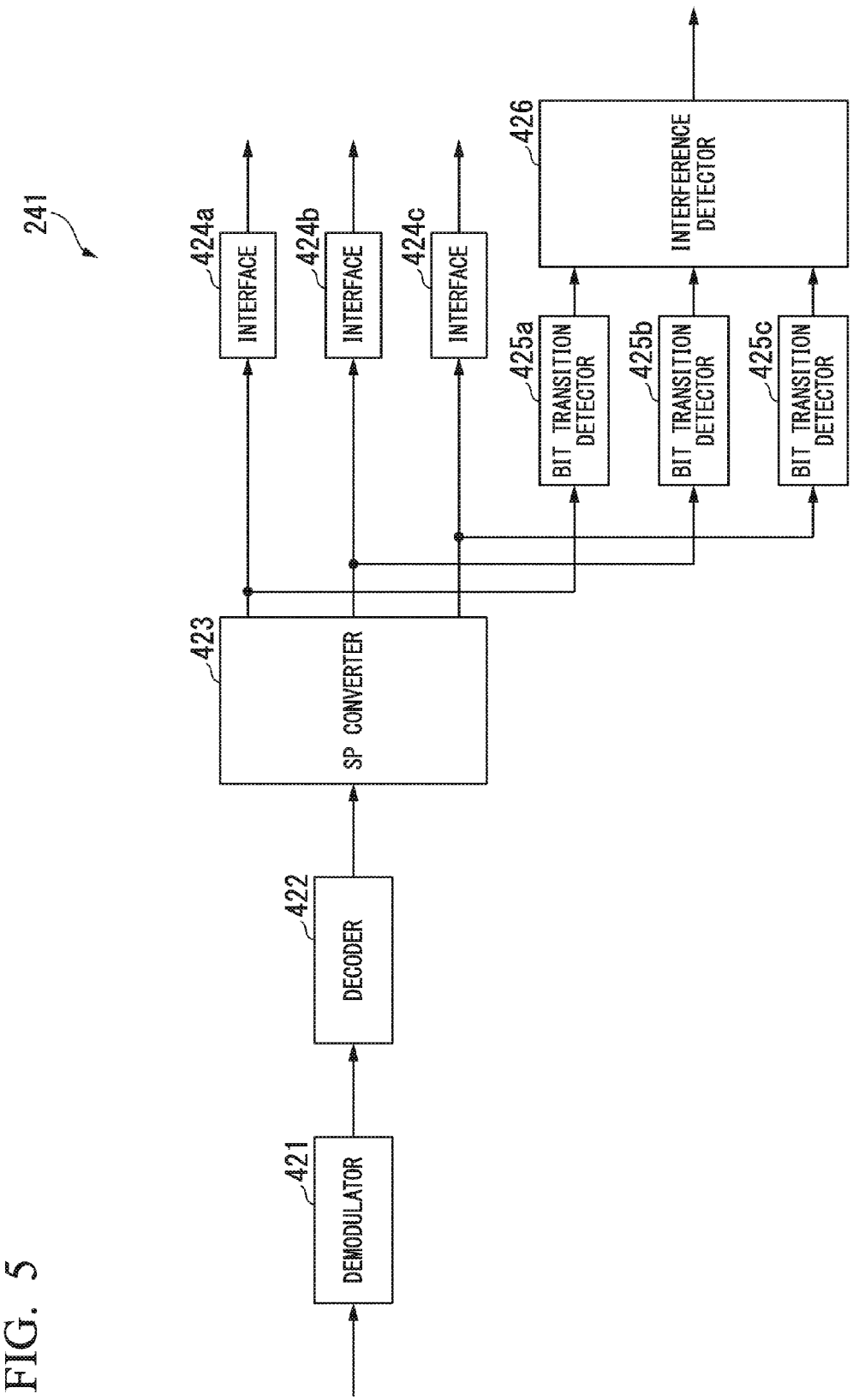
FIG. 5 is a simplified block diagram showing the constitution of a reception processing circuit of the first embodiment.

FIG. 5 is a simplified block diagram showing the constitution of the reception processing circuit 241. The reception processing circuit 241 includes a demodulator 421 a decoder 422, and SP converter 423, interfaces 424a, 424b, and 424c, bit transition detectors 425a, 425b, and 425c, and an interference detector 426. The demodulator 421 demodulates the baseband signal input from the AD conversion circuit 231. For example, if an on-off keyed signal is input, it is envelope detected and the detected signal is input to a comparator to obtain a digitally encoded signal. The demodulator 421 inputs this encoded signal to the decoder 422.

The decoder 422 decodes the encoded signal input from the demodulator 421. For example, if encoded signal was encoded using 8b/10b encoding, the decoder 422 performs 10b/8b conversion of the encoded input signal to obtain the serial information before encoding. The decoder 422 inputs the serial information to the SP converter 423.

The SP converter 423 (demultiplexer) converts (demultiplexes) the serial information input form the decoder 422 to parallel information (a plurality of signals), according to a given rule. The given rule is common to the transmitting side (PS converter 412) and the receiving side. The parallel information is, for example, the zoom magnification control signal, the zoom reduction control signal, and the lens switching control signal input at the transmitting side (PS converter 412). The SP converter 423, in accordance with the given rule, inputs the parallel information to the interfaces 424a, 424b, and 424c and to the bit transition detectors 425a. 425b, and 425c. In this case, the same information (for example, the zoom magnification control signal) is divided and input to the interface 424a and the bit transition detector 425a. In the same manner the same information (for example, the zoom reduction control signal) is divided and input to the interface 424b and the bit transition detector 425b, and the same information (for example, the lens switching control signal) is divided and input to the interface 424c and the bit transition detector 425c.

The interfaces 424a, 424b, and 424c input the parallel information input from the SP converter 423 (for example, the zoom magnification control signal, the zoom reduction control signal, and the lens switching control signal) to the control circuit 242. Although the example of three interfaces (424a, 424b, and 424c) is shown, there is no restriction to three, and the number may be two or four or greater, in which case the number thereof would be the same as the number of interfaces in FIG. 3.

The bit transition detectors 425a, 425b, and 425c detect bit transition in the parallel information input from the SP converter 423. If parallel information transitions from the binary value 0 to the binary value 1, or from the binary value 1 to the binary value 0, the bit transition detectors 425a, 425b, and 425c determine that there has been a bit transition. The bit transition detectors 425a, 425b, and 425c may determine that there has been a bit transition when there is a transition from a binary value 0 to a binary value 1 and from a binary value 1 to a binary value 0, or either one of these transitions. The bit transition detectors 425a, 425b, and 425c, for example, input to the interference detector 426 a pulse signal when a bit transition is detected and a low signal when a bit transition is not detected.

The interference detector 426 compares the bit transition detection results input from the bit transition detectors 425a. 425b, and 425c and if a bit transition (first bit transition) is detected from any of them, if a bit transition (second bit transition) occurs in any thereof within a pre-established time $t_{det}$ (predetermined time period), determines that interference has been detected. The interference detector 426 inputs the interference detection result to the control circuit 242. The bit transition detector 426 may determine that the interference has been detected only when the second bit transition was a bit transition detected by a bit transition detector different from the first bit transition detection.

The interference detector 426 may determine that an interfering signal has been detected when, within the pre-established time $t_{det}$, bit transitions are detected by all the bit transition detectors 425a, 425b, and 425c. Also, the interference detector 426 may determine that an interfering signal has been detected when not all of the bit transition detectors 425a, 425b, and 425c, but rather when at least a given number of bit transition detectors detect bit transitions within the time $t_{det}$.

Figure 6:
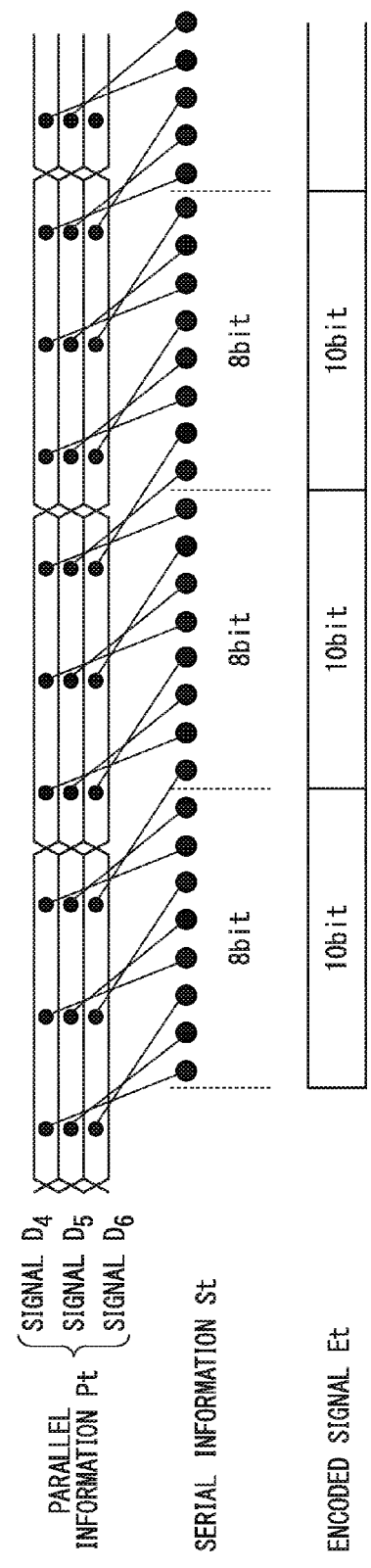
FIG. 6 is a schematic representation showing information conversion of a parallel-to-serial (PS) converter of the first embodiment.

FIG. 6 is a schematic representation describing the information conversion by the PS converter 412 according to the present embodiment. The signals $D_4$, $D_5$, and $D_6$ of the three control information A, B, and C, which are the parallel information Pt are the signals from the controller 11 that control the camera module 12 (the zoom magnification control signal, zoom reduction control signal, and lens switching control signal). The lens switching control signal controls whether to use a wide-angle lens or a telephoto lens. The zoom magnification control signal and zoom reduction control signal control the zoom ratio. These signal, for example, may conform to the RS-232C standard or have specifications conforming to the I2C specifications, and control by the RS-232C standard or I2C specifications is control of the camera focus and various camera settings.

Although the case shown is that of the three control information A. B, and C, this is not limited to three, and can be two or four or greater. The signals $D_4$, $D_5$, and $D_6$ of the control information A, B, and C are digital signals, and, after oversampling the signals $D_4$, $D_5$, and $D_6$, the PS converter 412 performs parallel-to-serial conversion thereof to obtain the serial information St. In the example of FIG. 6, the control information is three-fold oversampled, the sampled values of signals $D_4$, $D_5$, and $D_6$ at each time being used to generate a bit stream (serial information St) arranged in the sequence of signals $D_4$, $D_5$, $D_6$. The encoder 413 encodes the serial information St in 8-bit units, obtaining a 10-bit encoded signal after encoding. Although in this case the encoder 413 encodes information in 8-bit units to obtain a 10-bit encoded signal, this is not a restriction. Encoding may be done in units of another number of bits, and the number of bits after encoding may also be different.

Figure 7:
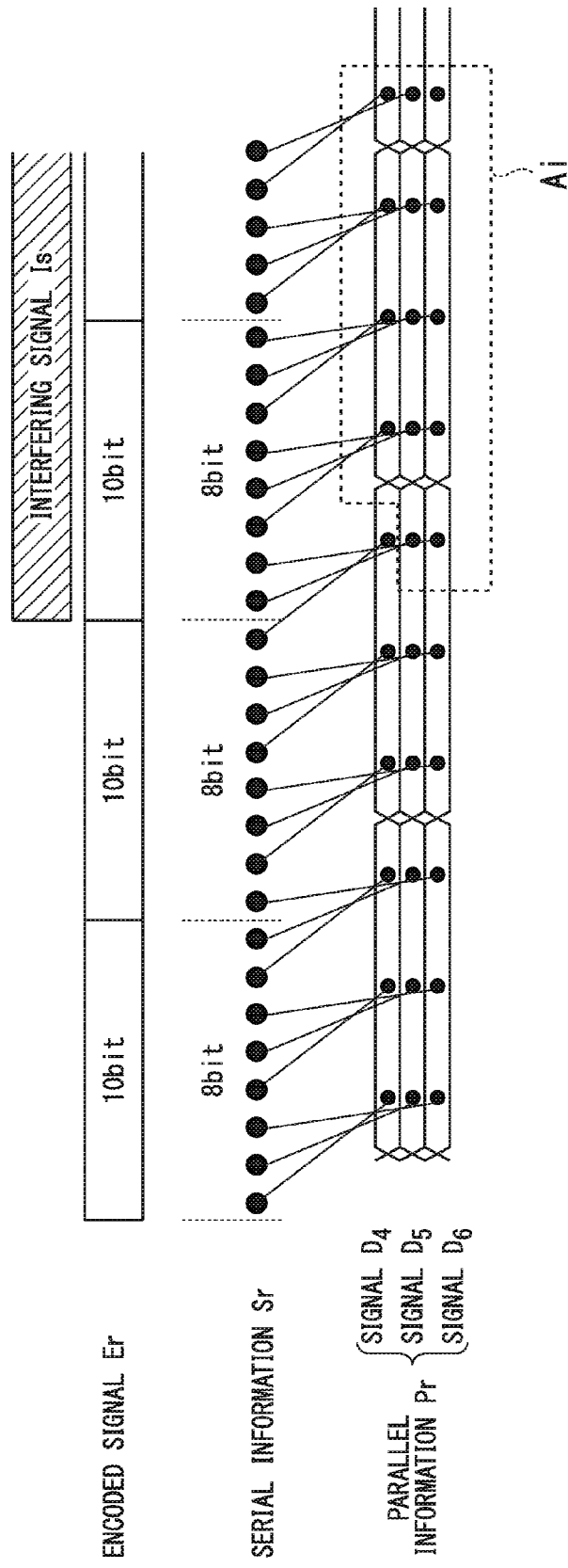
FIG. 7 is a schematic representation showing information conversion of a serial-to-parallel (SP) converter of the first embodiment.

FIG. 7 is a schematic representation describing the information conversion by the SP converter 423 according to the present embodiment. The serial signal Sr of linked 8-bit serial information of the encoded signal Er decoded in 10-bit units by the decoder 422 is input to the SP converter 423. The SP converter 423 performs a conversion (serial-to-parallel) that is the inverse of the conversion by the PS converter 412 so as to convert the serial information Sr to the parallel information Pr, to obtain the signals $D_4$, $D_5$, and $D_6$ of the control information A, B, and C.

FIG. 7 shows the example of the case in which a part of the received encoded signal Er is affected by the interfering signal Is. As shown in FIG. 7, the Ai part of the parallel signal Pr is affected by the interfering signal Is. It can be understood that all of the signals $D_4$, $D_5$, and $D_6$ of the control information A, B, and C are affected by the interference at the same time, with the exception of the timing edge.

Although the example of three control information A, B, and C is shown in this case, this is not limited to three, and may be two or four or greater. Additionally, although decoding is done in 10-bit units and an 8-bit encoded signal is obtained after decoding, this is not a restriction. Decoding may be done in units of another number of bits, and the number of bits after decoding may also be different.

Figure 8:
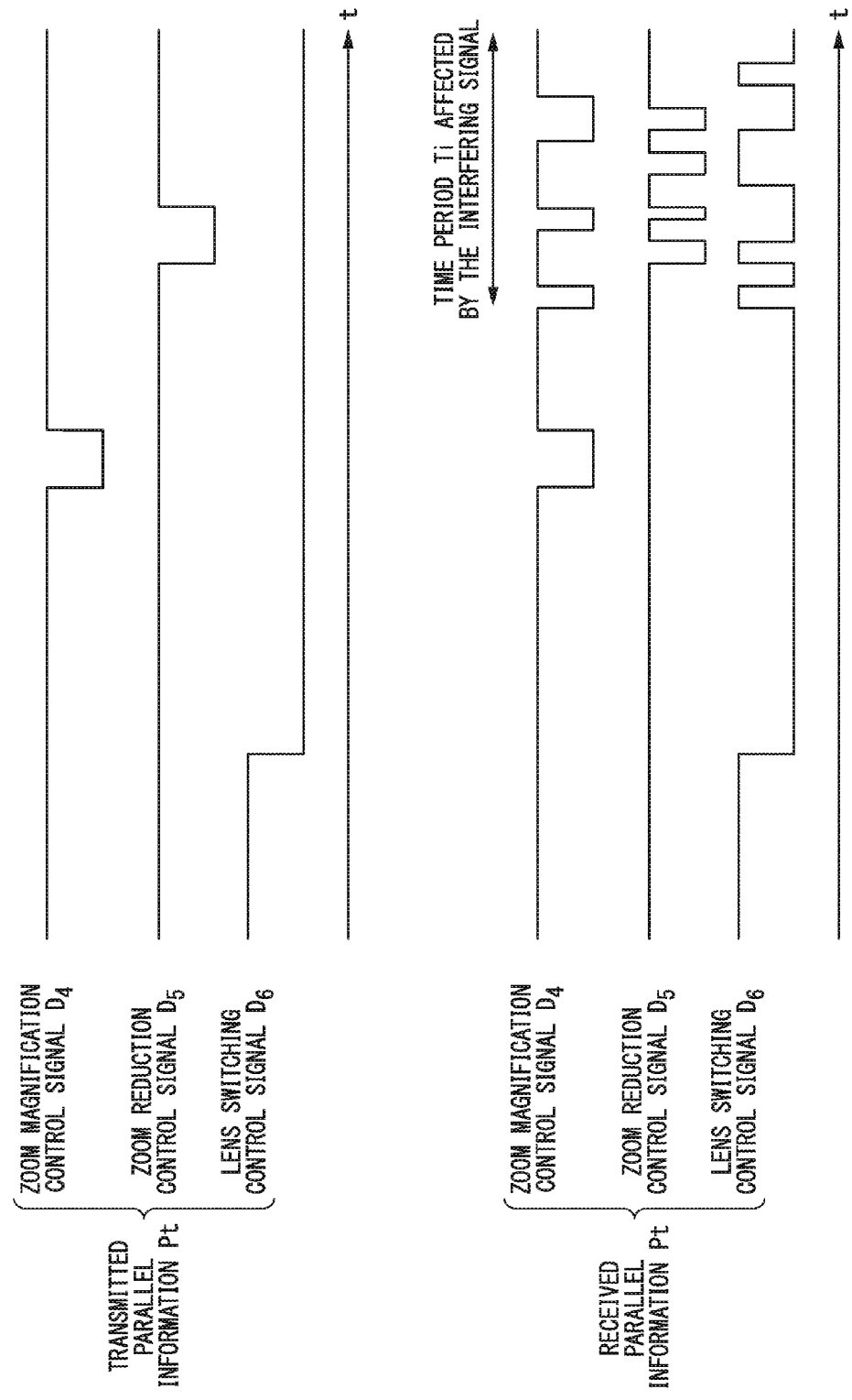
FIG. 8 is a timing diagram showing the bit transition in the control information of the first embodiment.

FIG. 8 is a timing diagram describing the bit transitions in the control information according to the present embodiment. This shows the example in which the signals $D_4$, $D_5$, and $D_6$ of the control information A, B, and C that are multiplexed to transmitted parallel information Pt are three control signals, the zoom magnification control signal $D_4$, the zoom reduction control signal $D_5$, and the lens switching control signal $D_6$. The bit values 0 and 1 are represented as low and high, respectively. The zoom magnification control signal $D_4$ is a control signal that issues a zoom magnification instruction, the zoom magnification instruction being given during the period in which it is low, and the zoom magnification being stopped when it is high. The zoom reduction control signal $D_5$ is a control signal that issues a zoom reduction instruction, the zoom reduction instruction being given during the period in which it is low, and the zoom reduction being stopped when it is high. The lens switching control signal $D_6$ instructs to switch the camera lens to a wide-angle lens when it is high and instructs to switch it to a telephoto lens when it is low.

Part of the received parallel information Pr in FIG. 8 is affected by the interfering signal during the time period Ti, indicating that information different from the transmitted parallel information Pt is received. As described regarding FIG. 7, all of the control information is affected by the interfering signal during the same time period Ti.

The zoom magnification control signal $D_4$ and the zoom reduction control signal $D_5$ are usually implemented by a single toggle switch in a user interface, so that the zoom magnification and reduction can be simultaneously controlled. It can be envisioned that there are almost no cases in which a user simultaneously controls the zoom magnification or reduction instruction and the lens switching instruction. Although it is dependent on the user interface, it can be envisioned that it almost never occurs that a plurality of control instructions are given within a period of for example, 100 ms.

That is, in the controller 11, it is imagined that, within a sufficiently short period of time such as 100 ms or less, a signal will almost never be transmitted in which a plurality of or all hits of the control information transition. In the camera module 12, therefore, with the time to set to 100 ms, if a signal is received in which, within a sufficiently short period of time such as within 100 ms, there is a plurality of or all bits of the control information transition, it can be thought that an interfering signal is having its effect.

There is a plurality of general means for detecting received signal errors such as addition of a CRC (cyclic redundancy check) that checks for errors to each frame, splitting the wireless signal into units such as frames, and transmission of a known signal. The camera module 12 in the present embodiment receives a signal multiplexed from a plurality of signals, and the interference detector 426 detects interference, based on bit transitions of the plurality of signals within a predetermined time period. This enables detection of interference without having such a CRC or known signal. That is, because there is no overhead by such a CRC or known signal, it is possible to detect interference with a superior transmission efficiency.

The interference detector 426 determines that interference has been detected if some bit transition is detected within a predetermined time period after detecting some bit transition from among the plurality of signals. The interference detector 426 determines that interference has been detected only if the second bit transition is detected from a different bit transition detector than the first bit transition. The interference detector 426 determines that an interfering signal has been detected if all the bit transition detectors 425a, 425b, and 425c detect bit transitions within the pre-established time $t_{det}$. The interference detector 426 determines that an interfering signal has been detected if at least a given number of bit transition detectors detect a bit transition within the time $t_{det}$.

Because the judgment of interference is made only in the above-described predetermined time period, this enables high-speed detection of interference.

Second Embodiment

Although the constitution of the communication system 10 of the second embodiment is similar to the communication system 10 in the first embodiment, it differs with regard to the interference detector 426 of the camera module 12. Because other constituent elements are the same as in the first embodiment, their descriptions will be omitted.

Figure 9:
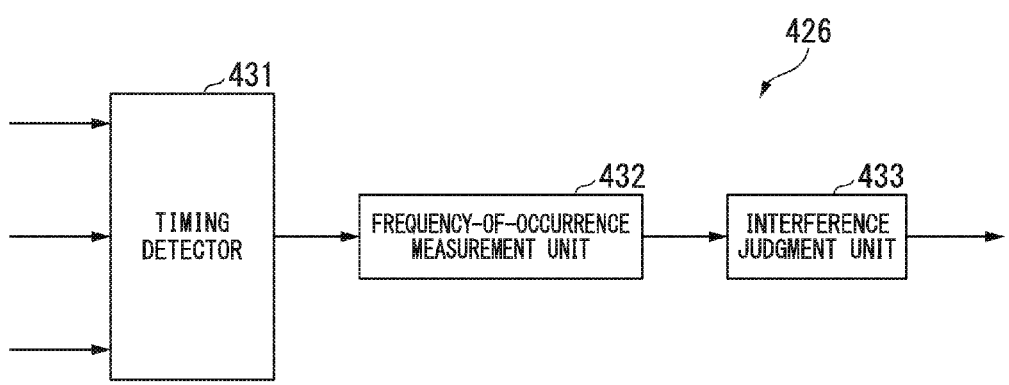
FIG. 9 is a simplified block diagram showing the constitution of an interference detector of a second embodiment.

FIG. 9 is a simplified block diagram showing the constitution of the interference detector 426 according to the present embodiment. The interference detector 426 of the present embodiment includes a timing detector 431, a frequency-of-occurrence measurement unit 432, and an interference judgment unit 433. The timing detector 431, similar to the interference detector 426 in the first embodiment, compares the bit transition detection results input from the bit transition detectors 425a, 425b, and 425c and, if it is detected that some bit transition occurred and then, within a given period of time $t_{det}$ (predetermined time period) some bit transition was detected, generates a high-level timing detection signal, and generates a low-level timing detection signal at other times.

The frequency-of-occurrence measurement unit 432 measures the frequency of occurrence of the timing detection signal input from the timing detector 431 being high. For example, the frequency-of-occurrence measurement unit 432 counts the number of times the signal changes to high level in a given period of time. The frequency-of-occurrence measurement unit 432 inputs the number of times counted as the frequency of occurrence to the interference judgment unit 433.

The interference judgment unit 433 compares the frequency of occurrence input from the frequency-of-occurrence measurement unit 432 with a pre-established threshold and if the input frequency of occurrence is at least the threshold, determines that interference has been detected. Below the threshold, the interference judgment unit 433 determines that interference has not been detected. The interference judgment unit 433 inputs the judgment result to the control circuit 142 in accordance with the interference detector 426.

In the present embodiment as well, similar to the first embodiment, interference can be detected with superior transmission efficiency.

The interference detector 426 in the present embodiment determines that interference has been detected based on the detected frequency of occurrence of a bit transition within a predetermined time period after detecting some bit of the multiplexed plurality of signals transitions, thereby reducing the probability of erroneous detection.

Third Embodiment

Although the communication system 10 of the third embodiment has a constitution similar to that of the communication system 10 of the first embodiment, it differs with regard to the interference detector 426 of the camera module 12. Because other constituent elements are the same as in the first embodiment, their descriptions will be omitted.

Figure 10:
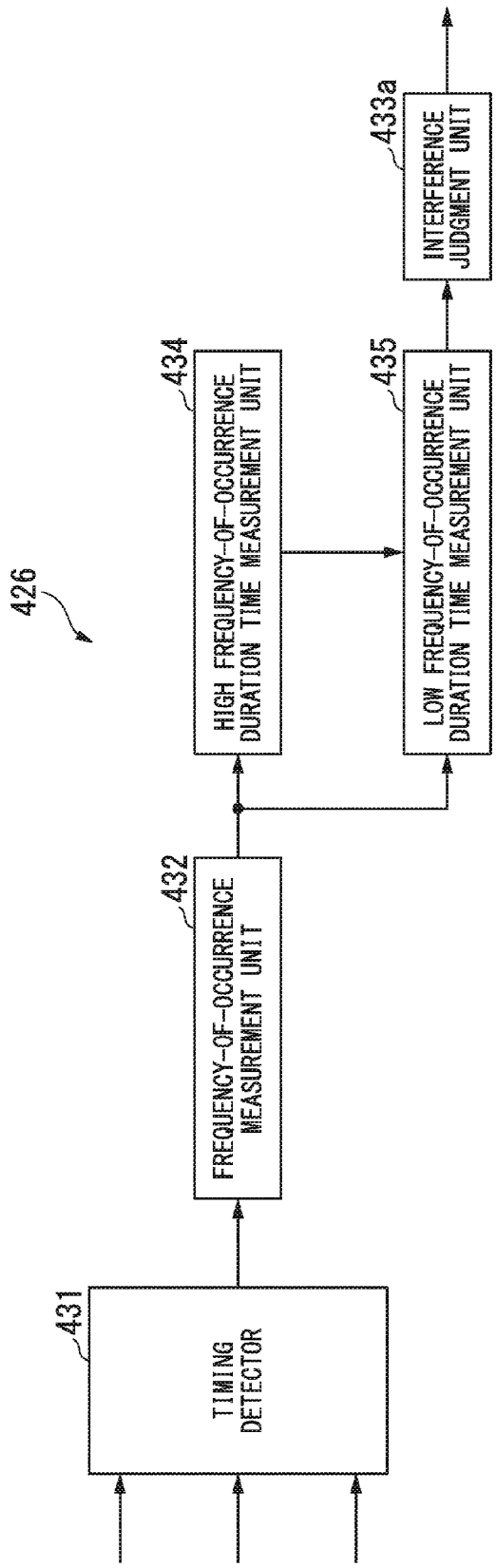
FIG. 10 is a simplified block diagram showing the constitution of an interference detector of a third embodiment.

FIG. 10 is a simplified block diagram showing the constitution of the interference detector 426 according to the present embodiment. In this drawing, parts corresponding to those in FIG. 9 are assigned the same reference symbols (426 and 427), and the descriptions thereof will be omitted. The interference detector 426 according to the present embodiment includes a timing detector 431, a frequency-of-occurrence measurement unit 432, a high frequency-of-occurrence duration time measurement unit 434, a low frequency-of-occurrence duration time measurement unit 435, and an interference judgment unit 433a.

The high frequency-of-occurrence duration time measurement unit 434 compares the frequency-of-occurrence input from the frequency-of-occurrence measurement unit 432 with a pre-established threshold and, measures the duration time during which the input frequency of occurrence is at least the threshold. With the minimum value of the duration time set to $t_H$ and the maximum value of the duration time set to $t_F$, the high frequency of occurrence duration time measurement unit 434 outputs a high level when the condition in which the input frequency of occurrence is at least the threshold is maintained for at least the minimum value $t_H$ and no greater than the maximum value $t_F$, and outputs a low level at other times. The minimum value $t_H$ and the maximum value $t_F$ of the duration time are set, for example, to the shortest frame length and the longest frame length in a predetermined protocol, such as the IEEE 801.11 1ad. The shortest frame length may be the sum of the preamble length and the time for transmitting the MAC header information. The minimum value $t_H$ may be set to a value that is at least the shortest frame length, and the maximum value $t_F$ may be set to a value that is no greater than the maximum frame length.

When a high level is input from the high frequency-of occurrence duration time measurement unit 434, the low frequency-of-occurrence duration time measurement unit 435 compares the frequency-of-occurrence input from the frequency-of-occurrence measurement unit 432 with a pre-established threshold and, measures the duration time during which the input frequency of occurrence is no greater than the threshold. This threshold may be the same as that in the high frequency-of-occurrence duration time measurement unit 434, or may be different therefrom. The low frequency of occurrence duration time measurement unit 435 outputs a high level when the condition in which the input frequency-of-occurrence is no greater than the threshold is maintained for at least the minimum value $t_S$ and outputs a low level at other times. The minimum value $t_S$ may be set, for example, to the no-signal time after transmission of a frame $t_{SIFS}$ (where SIFS is short interframe space) in a predetermined protocol such as IEEE 801.11ad. The minimum value $t_H$ may be set to a value that is at least the no-signal time $t_{SIFS}$.

When a high level is input from the low frequency-of-occurrence duration time measurement unit 435, the interference detector 433a determines that interference has been detected.

As described above, by setting $t_H$, $t_F$, and $t_{SIFS}$, the high frequency-of-occurrence duration time measurement unit 434 detects frame transmission in a predetermined protocol, and the low frequency-of-occurrence duration time measurement unit 435 detects the no-signal time after frame transmission. This enables the interference detector 426 in the present embodiment to determine that interference has been detected when wireless communication is done by a wireless system using a predetermined protocol in the same frequency band.

Although the present embodiment has a high frequency-of-occurrence duration time measurement unit 434 and a low frequency-of-occurrence duration time measurement unit 435, it may have only the high frequency-of-occurrence duration time measurement unit 434. Additionally, with only the high frequency-of-occurrence duration time measurement unit 434, the high frequency-of-occurrence duration time measurement unit 434 may output a high level when the condition in which the input frequency-of-occurrence is at least the threshold is maintained for at least the minimum value $t_H$.

Although in the present embodiment the existence of one frame as the interfering signal is detected by a wireless using the same frequency band, judgment of detection of interference may be made after detecting more than some plurality of frames.

In the present embodiment as well, similar to the first embodiment, detection of interference can be done with superior transmission efficiency.

The interference detector 426 in the present embodiment determines that interference has been detected when the amount of time during which the frequency-of-occurrence of bit transitions is at least a threshold exceeds the shortest frame length of a predetermined protocol.

This enables judgment of the detection of interference when there is frame transmission in the predetermined protocol.

The interference detector 426 determines that interference has been detected when the duration of time when the frequency-of-occurrence of bit transitions is at least the threshold exceeds the shortest frame length and is no greater than the longest frame length in a predetermined protocol, after which the duration of time when the frequency-of-occurrence is less than the threshold is at least the no-signal time after a frame in the predetermined protocol.

This enables judgment of the detection of interference at the time of frame transmission in a predetermined protocol.

Fourth Embodiment

Figure 11:
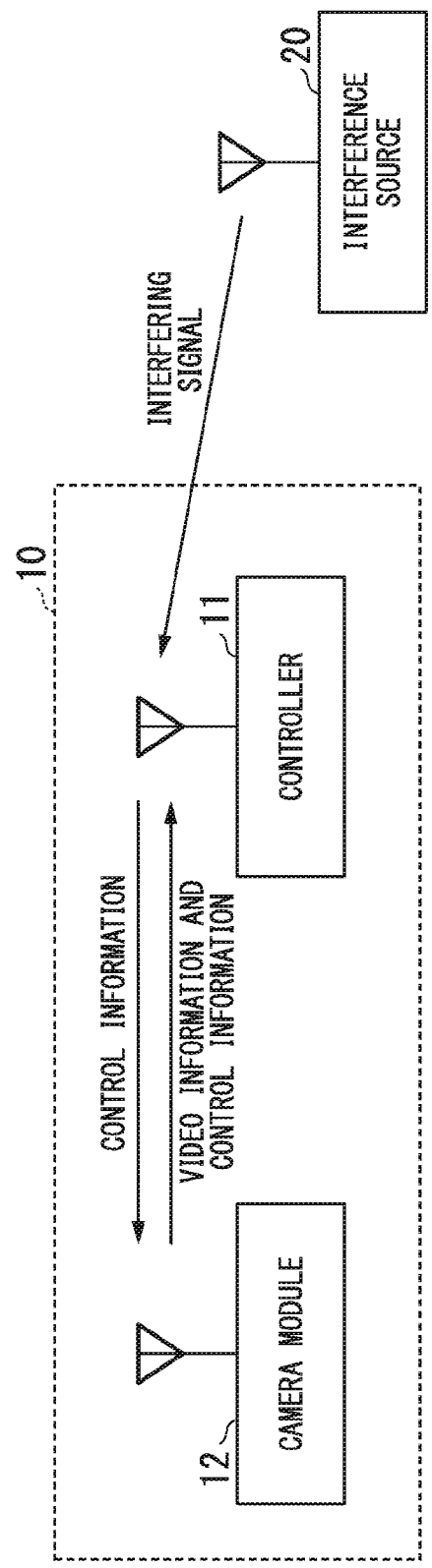
FIG. 11 is a conceptual view showing a communication system of a fourth embodiment.

FIG. 11 is a conceptual view showing the constitution of a communication system 10 in the fourth embodiment. Although the communication system 10 of the present embodiment has a constitution similar to that of the communication system 10 of the first embodiment, it differs with regard to the controller 11 (receiving device) having a display and video information and control information being transmitted from the camera module 12 (transmitting device) to the controller.

As shown in FIG. 11, when the distance between the controller 11 and the interference source 20 is short, there is a possibility that the controller 11 will be affected by the interfering signal and will not be able to receive video information and control information properly, thereby hindering the desired operation. It is desirable that the controller 11 detects an interfering signal and avoid interference. The embodiment discussed is particularly with regard to detecting an interfering signal.

Figure 12:
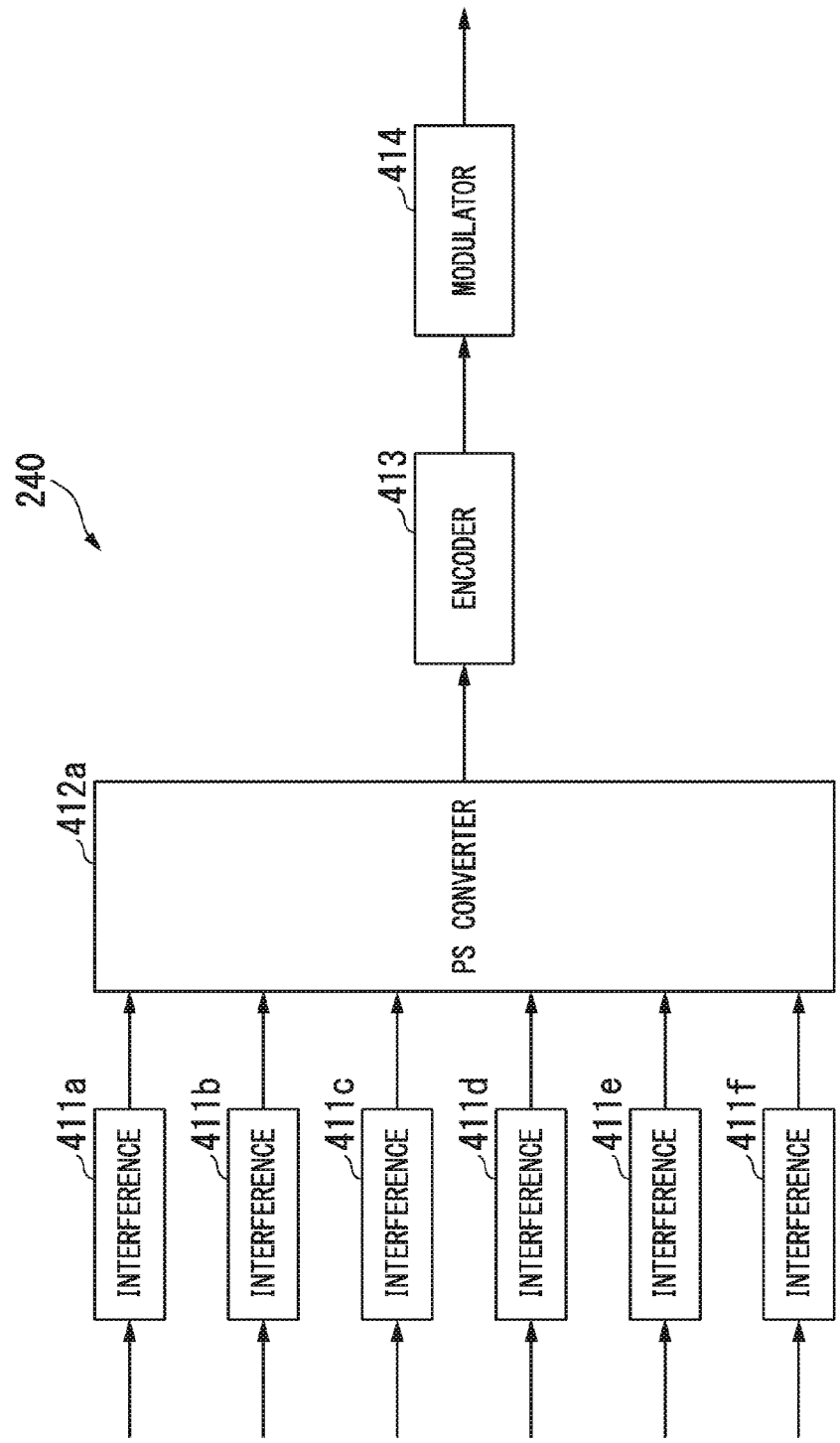
FIG. 12 is a simplified block diagram showing the constitution of a transmission processing circuit of the camera module of the fourth embodiment.

FIG. 12 is a simplified block diagram showing the constitution of a transmission processing circuit 240 of the camera module 12. In this drawing, parts corresponding to those in FIG. 3 are assigned the same reference symbols, and the descriptions thereof will be omitted.

Although the transmission processing circuit 240 has substantially the same constitution as the transmission processing circuit 140 of the controller 11, it differs in that it has interfaces 411d, 411e, and 411f, and in that it has, in place of the PS converter 412, the PS converter 412a. The interfaces 411a, 411b, 411c, 411d, 411e, and 411f input, respectively, the data information Dt, the data information synchronization information Syt, the known information Kt (known signal), and the control information A, B, and C from the control circuit 242. Of these, the data information Dt and the data information synchronization information Syt are video information.

The data information Dt is, for example, video information captured by the camera module 12. The data information synchronization information Syt is, for example, used for frame synchronization of the video information. The known information is, for example, used for reception processing of a signal transferred between parallel-serial and serial-parallel. The control information A, B, and C are, for example, signals conforming to the RS-232C standard, signals conforming to the I2C specifications, or signals for notification of the status of the camera module 12. Although the data information Dt, the data information synchronization information Syt, and the known signal Kt are shown by example as being only one each, they can be a multiple. Also, although the example shown has the three control information A, B, and C, there is no restriction to there being three, and there may be two or four or more.

The PS converter 412a converts the parallel information input from each of the interfaces 411a, 411b, 411 c, 411d, 411e, and 411f to serial information according to a given rule similar to the PS converter 412.

Figure 13:
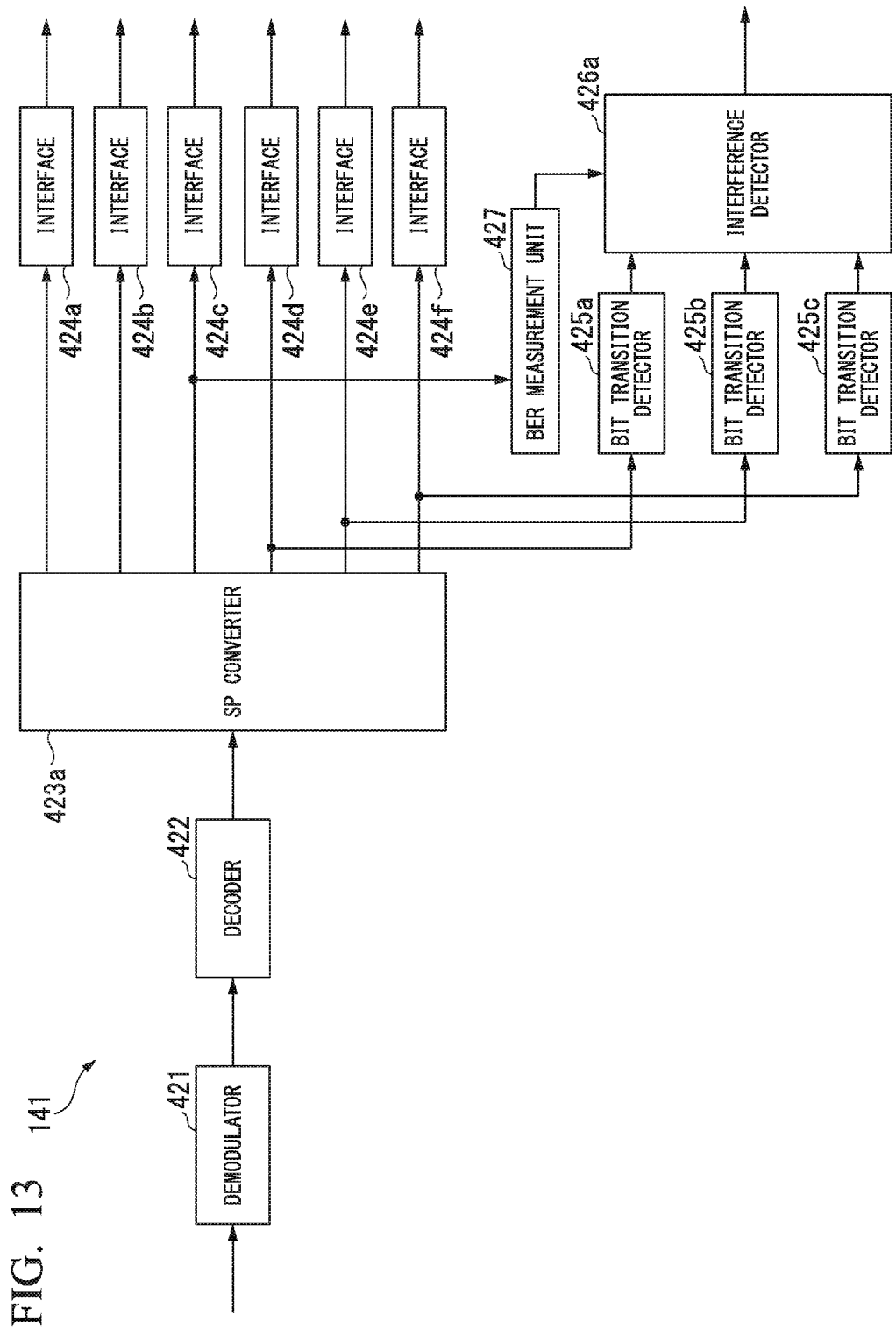
FIG. 13 is a simplified block diagram showing the constitution of a reception processing circuit of the controller of the fourth embodiment.

FIG. 13 is a simplified block diagram showing the constitution of the reception processing circuit 141 of the controller 11. In FIG. 13, parts corresponding to those in FIG. 5 are assigned the same reference symbols, and the descriptions thereof will be omitted. The reception processing circuit 141 of the present embodiment includes a decoder 421, a decoder 422, an SP converter 423a, interfaces 424a, 424b, 424c, 424d, 424e, and 424f, bit transition detectors 425a, 425b, and 425c, an interference detector 426a, and a BER measurement unit 427.

The SP converter 423a, similar to the SP converter 423 of FIG. 5, performs serial-to-parallel conversion and inputs signals of the data information Dr, the data information synchronization information Syr, the known information Kr, and the control information A, B, and C to the interfaces 424a, 424b, 424c, 424d, 424e, and 424f, respectively. The BER measurement unit 427, of the signals output by the SP converter 423a, compares the known information Kr with known information that the controller 11 has beforehand and measures the different frequencies of occurrence thereof, that is, the bit error rate (BER). The BER measurement unit 427 outputs a high level if the bit error rate is higher than a predetermined threshold $R_{ccrMAX}$, and outputs a low level at other times.

The interference detector 426a, similar to the interference detector 426, detects interference and also references the output of the BER measurement unit 427. For example, when the BER measurement unit 427 has output a high level or when the interference detector 426a makes the same type of judgment as the interference detector 426, the interference detector 426a determines that interference has been detected. Alternatively, when the BER measurement unit 427 has output a high level and also when the interference detector 426a makes the same type of judgment as the interference detector 426, the interference detector 426a determines that interference has been detected.

Figure 14:
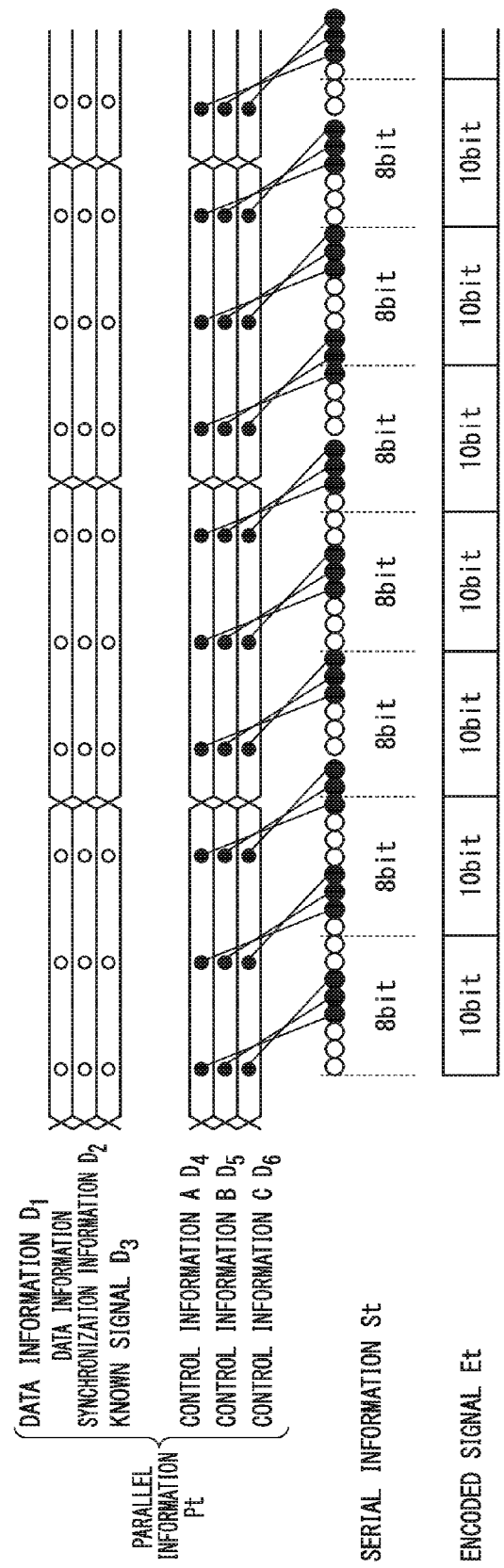
FIG. 14 is conceptual view showing information conversion of the PS converter of the fourth embodiment.

FIG. 14 is a schematic representation describing the information conversion by the PS converter 412a according to the present embodiment. The parallel information Pt are the signals of the data information $D_1$, the data information synchronization information $D_2$, the known signal $D_3$, and the control information A, B, and C signals $D_4$, $D_5$, and $D_6$. This parallel information are digital signals, and, after oversampling these signals, the PS converter 412a performs parallel-to-serial conversion thereof to obtain the serial data St. In the example of FIG. 14, each of the control information is three-fold oversampled. The serial information St is encoded in 8-bit units, obtaining a 10-bit encoded signal Et after encoding. Although encoding is done in 8-bit units and a 10-bit encoded signal is obtained after encoding, this is not a restriction, and the number of bits in the encoding unit may be different and the number of bits after encoding may also be different.

Figure 15:
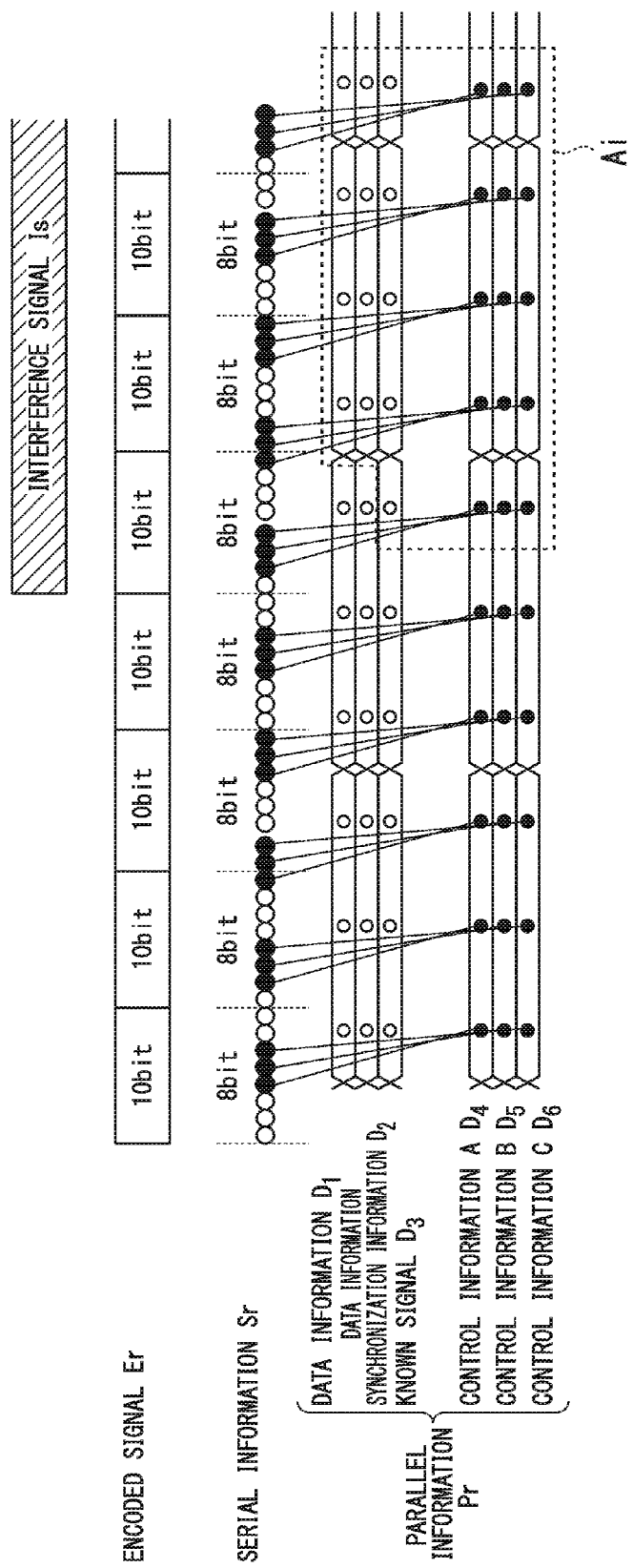
FIG. 15 is a conceptual view showing information conversion of an SP converter of the fourth embodiment.

FIG. 15 is a schematic representation of the information conversion by the SP converter 423a according to the present embodiment. The received encoded signal Er is decoded in units of 10 bits, so as to obtain 8-bit serial information Sr after decoding. The SP converter 423a converts the serial information Sr to the parallel information Pr by serial-to-parallel conversion, thereby obtaining the signals of the data information $D_1$, the data information synchronization information $D_2$, and the known information $D_3$, and the control information A, B, and C signals $D_4$, $D_3$, and $D_6$. FIG. 15 shows an example of the case in which the part Ai of the received encoded signal is affected by interference signal Is. As shown in FIG. 15, the part Ai of the parallel information is affected by the interfering signal Is. It can be understood that all of the data information $D_1$, the data information synchronization information $D_2$, the known information $D_3$, and the control information A, B, and C signals $D_3$, $D_5$, and $D_6$ are affected by interference at the same timing, with the exception of the timing edge.

Although in the example shown there are one each of the data information $D_1$, the data information synchronization information $D_2$, and the known information $D_3$, these may be multiple. Also, although there are three control information A, B, and C, there is no restriction to there being three, and there may be two or may be four or more. Although decoding is done in 10-bit units, and an 8-bit encoded signal is obtained after decoding, these are not restrictions. The decoding may be done in units of a different number of bits, and a different number of bits may be obtained after decoding.

Figure 16:
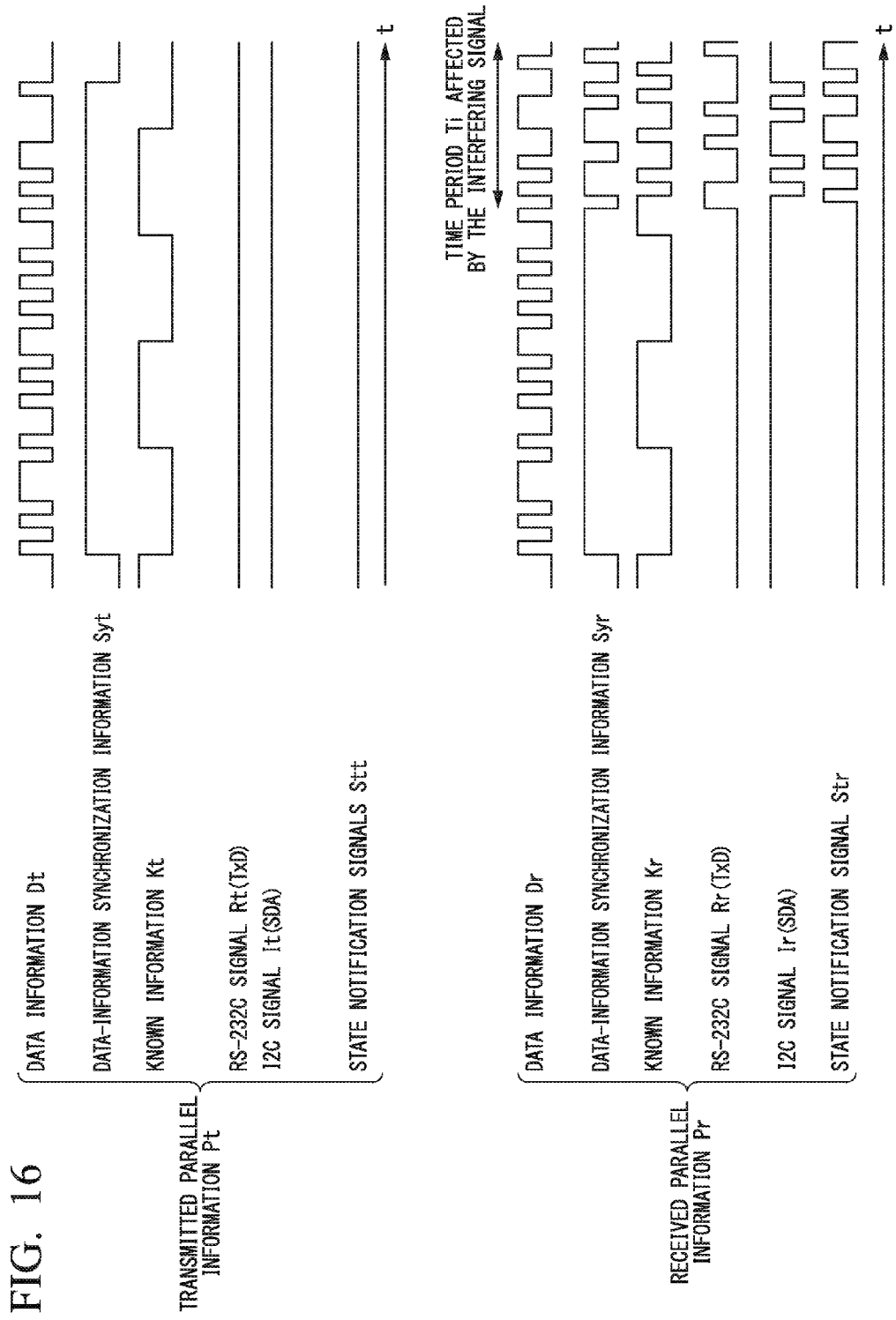
FIG. 16 is a timing diagram showing bit transitions in the parallel information of the fourth embodiment.

FIG. 16 is a drawing describing the bit transitions in the parallel data according to the present embodiment.

This is the example of the transmitted parallel information Pt being the data information Dt, the data information synchronization information Syt, the known information Kt, and the three control information signals. Examples of the control information signals are the three control signals: an RS-232C signal Rt (TxD), an I2C signal It (SDA), and a state notification signals Stt. The bit values 0 and 1 are represented as low and high.

The data information Dt, the data information synchronization information Syt, and the known information Kt are similar to the data information $D_1$, the data information synchronization information $D_2$, and the known information $D_3$ in FIG. 14. The RS-232C signal (TxD) is, for example, control information that, in response to an instruction of control information transmitted by the controller 11, transmits some sort of message from the camera module 12. The I2C signal It (SDA) is, for example, control information sent as ACK (acknowledgement) that the camera module 12 has correctly received control information transmitted by the controller 11 by I2C. The state notification signal Stt is a state signal that notifies of the state of the camera module 12, for example, control information that transmits a high level when the depletion of the battery installed in the camera module is detected and a low level at other times.

The received parallel information Pr is the data information Dr, the data information synchronization information Syr, the known information Kr, and three control information signals. Examples of the three control information signals are an RS-232C signal Rr (TxD), an I2C signal Ir (SDA) and the state notification signal Pr. A part of the received parallel information Pr in FIG. 16 is affected by an interfering signal in the time period Ti, indicating that information different from the transmitted parallel information Pt has been received. As described regarding FIG. 15, all of the video information and the control information are affected by interference during the same time period.

If video information is transmitted as the data information, bit transitions usually occur frequently. Thus, it is difficult to determine whether it is being affected by interference by detecting the bit transitions of the data information.

The frequency-of-occurrence of bit transitions of the data information synchronization information vary, depending upon the specifications of the video signal, and the frequency-of-occurrence of the known signal vary depending upon the communication system specifications.

Of the control information, transmission requests for the RS-232C signal (TxD) and the I2C signal (SDA) are generated in response to control information transmitted by the controller 11 simultaneous bit transitions in these signals can be thought of as almost never occurring. Because the state notification signal has a bit transition when depletion of the battery is detected, it is difficult to envision frequent bit transitions thereof.

That is, in the controller 11 it can be envisioned that it almost never occurs that signals are transmitted in which a plurality of bit transitions or bit transitions of all control information occurs within a sufficiently short time period. In the controller 11, if a signal is received in which a plurality of bit transitions or bit transitions of all control information occurs within a sufficiently short time period, it can be thought that an interfering signal is having an effect.

In this manner, when the controller 11 transmits data information such as video information and control information, interference is detected based on the bit transitions of the one of these having the lower frequency of occurrence of bit transitions (in this case, the control information), thereby achieving the same effect as the first embodiment.

Additionally, the transmitted information includes the signal of known information, and interference is detected based on the difference in frequencies of occurrence between the received known information signal and the known signal which it already had, thereby enabling detection of interference with greater certainty.

Fifth Embodiment

Figure 17:
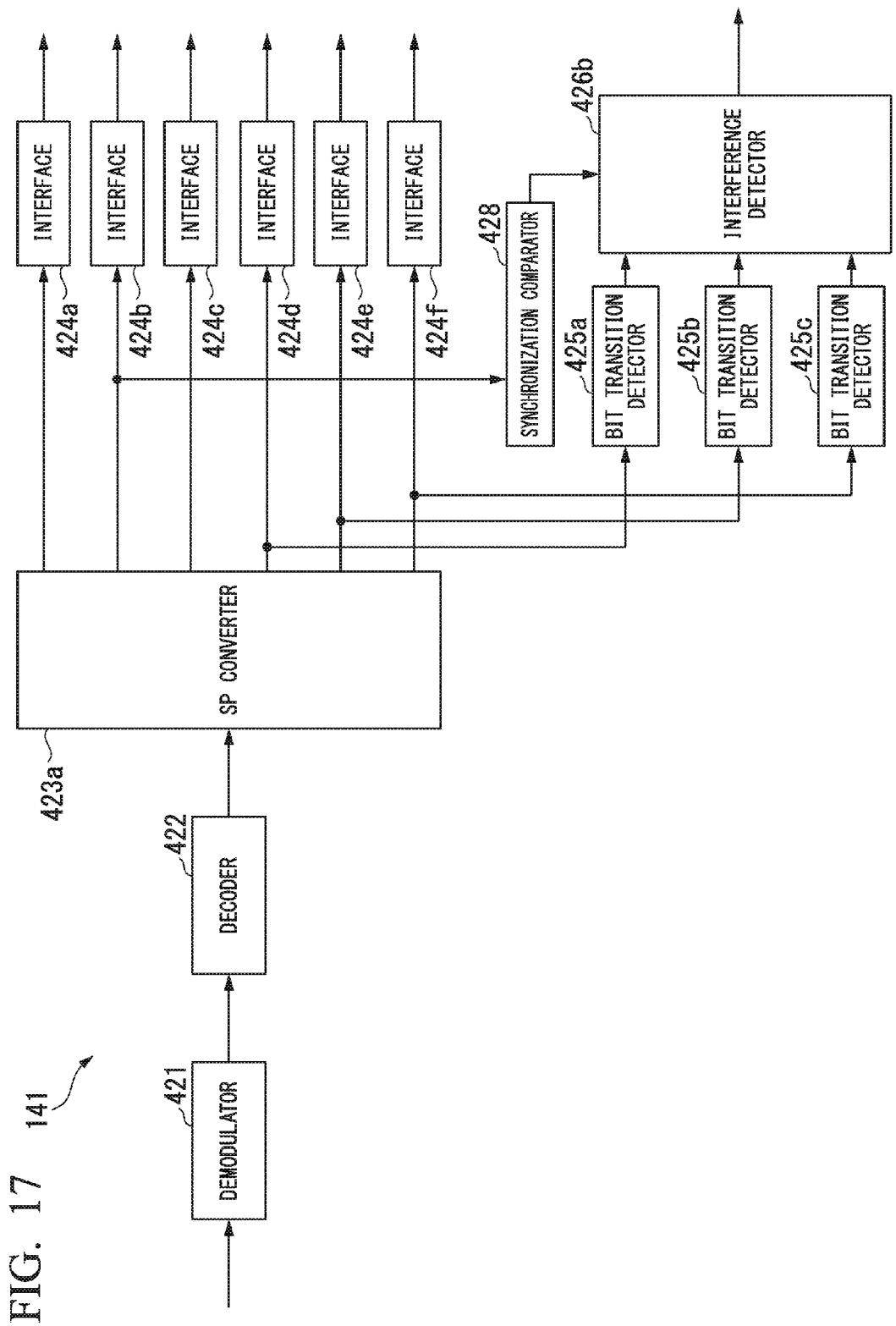
FIG. 17 is a simplified block diagram showing the constitution of the reception processing circuit of a fifth embodiment.

Although the communication system 10 of the fifth embodiment has a constitution similar to that of the communication system 10 of the fourth embodiment, the reception processing circuit 141 of the controller 11 is different. Because other constituent elements are the same as in the fourth embodiment, the descriptions thereof will be omitted. FIG. 17 is a simplified block diagram showing the constitution of the reception processing circuit 141 according to the present embodiment. In this drawing, parts corresponding to those in FIG. 16 are assigned the same reference symbols, and the descriptions thereof will be omitted. The reception processing circuit 141 according to the present embodiment includes a demodulator 421, a decoder 422, an SP converter 423a, interfaces 424a, 424b, 424c, 424d, 424e, and 424f, bit transition detectors 425a, 425b, and 425c, an interference detector 426b, and a synchronization comparator 428.

The synchronization comparator 428 inputs a split-off of the parallel information (data information synchronization information Syr) input to the interface 424b from the SP converter 423a. The synchronization comparator 428 compares the input data information synchronization information Syr with desired synchronization information at that timing and performs synchronization processing and generation of the desired synchronization information, using, for example, synchronization information given beforehand. The method of synchronization processing, for example, may be the same processing as the synchronization processing performed in the interface 424b, which is the output destination. The synchronization comparator 428 determines whether or not there is a difference in information as a result of the comparison between the data information synchronization information Syr and the desired synchronization information. The judgment results of whether there is a difference is output to the interference detector 426b by the synchronization comparator 428 as a high level if the result was different than the previous comparison and low of there was no difference.

The interference detector 426b handles the outputs from the synchronization comparator 428 the same as the other bit transition detectors 425a, 425b, and 425c, and detects interference in the same manner as the interference detector 426. That is, the interference detector 426b senses that a bit transition has occurred if the output from the synchronization comparator 428 is the high level.

This enables the same type of effect as the first embodiment.

Additionally, the information to be transmitted includes a synchronization information signal, and interference is detected based on the result of detecting a difference between the received known information signal and the synchronization signal generated on the receiving side, thereby enabling detection of interference with greater certainty.

In the above-described embodiments, the reception processing circuits 141 and 241 may have the demodulator 421 and the decoder 422 and the control circuit 142 may have all or a part of the other parts.

In the above-described embodiments, the transmission processing circuits 140 and 240 may have the encoder 413 and the modulator 414, and the control circuit 142 may have all or a part of the other parts.

Although in the above-described embodiments a wireless communication device is installed in the controller 11 and the camera module 12, they may be installed, for example, in a smartphone, a tablet terminal, a personal computer, or a home appliance or other device.

According to at least one embodiment described above, by having an interference detector that detects interference based on bit transitions in a plurality of multiplexed signals during a predetermined time period, it is possible to detect interference with superior transmission efficiency.

While certain embodiments have been described, these embodiments have been presented by way of example only, and are not intended to limit the scope of the inventions. Indeed, the novel embodiments described herein may be embodied in a variety of other forms, and various omissions, substitutions and changes in the form of the embodiments described herein may be made without departing from the spirit of the inventions. The accompanying claims and there equivalents are intended to cover such forms or modifications as would fall within the scope and spirit of the invention.

What is claimed is:

1. A receiving device comprising:
a receiver to receive a multiplexed signal;
a demultiplexer to demultiplex the multiplexed signal into a plurality of signals; and
an interference detector to, by referring to transitions in bit of the plurality of signals in a predetermined time period, detect interference caused by another device in the multiplexed signal;
wherein the interference detector detects the interference by referring to a frequency-of-occurrence of transitions in bit of any signal of the demultiplexed signals within the predetermined time period after a transition in bit occurs in the demultiplexed signals; and
wherein the interference detector determines that the interference is detected in cases in which a first amount of time during which the frequency-of-occurrence remains higher than or equal to a threshold exceeds a shortest frame length in a predetermined protocol and in which the first amount of time is less than or equal to a longest frame length in the predetermined protocol, and in which a second amount of time during which the frequency-of-occurrence remains less than the threshold follows the first amount of time, the second amount of time being longer than or equal to a no-signal time period after a frame in the predetermined protocol.

2. A receiving device comprising:
a receiver to receive a multiplexed signal;
a demultiplexer to demultiplex the multiplexed signal into a plurality of signals; and
an interference detector to, by referring to transitions in bit of the plurality of signals in a predetermined time period, detect interference caused by another device in the multiplexed signal;
wherein the interference detector detects the interference by referring to a frequency-of-occurrence of transitions in bit of any signal of the plurality of demultiplexed signals;

wherein the interference detector determines that the interference is detected in cases in which a first amount of time during which the frequency-of-occurrence remains higher than or equal to a threshold exceeds a shortest frame length in a predetermined protocol and in which the first amount of time is less than or equal to a longest frame length in the predetermined protocol, and in which a second amount of time during which the frequency-of-occurrence remains less than the threshold follows the first amount of time, the second amount of time being longer than or equal to a no-signal time period after a frame in the predetermined protocol.

3. The receiving device according to claim 2, wherein the plurality of demultiplexed signals include a first synchronization information, and the interference detector determines whether or not the first synchronization information is the same as a second synchronization information generated by the receiving device, and the interference detector determines that a transition in bit has occurred, in a case in which the interference detector determines that a result of the determination at a current time is different from a result of the determination at a previous time.

4. The receiving device according to claim 2, wherein:
the plurality of demultiplexed signals include a known signal, and
the interference detector determines whether the interference is detected, based on not only the transitions in bit, but also a frequency-of-occurrence of cases in which the known signal is different in value from known values.

5. An interference detection method of a receiving device, comprising:
receiving a multiplexed signal;
demultiplexing the multiplexed signal into a plurality of signals; and
detecting interference caused by another device in the multiplexed signal by referring to transitions in bit of the plurality of signals in a predetermined time period;
wherein, in the detecting, the interference is detected by referring to a frequency-of-occurrence of transitions in bit of any signal of the demultiplexed signals within the predetermined time period after a transition in bit occurs in the demultiplexed signals; and
wherein the detecting includes determining that the interference is detected in cases in which a first amount of time during which the frequency-of-occurrence remains higher than or equal to a threshold exceeds a shortest frame length in a predetermined protocol and in which the first amount of time is less than or equal to a longest frame length in the predetermined protocol, and in which a second amount of time during which the frequency-of-occurrence remains less than the threshold follows the first amount of time, the second amount of time being long than or equal to a no-signal time period after a frame in the predetermined protocol.

6. An interference detection method of a receiving device, comprising:
receiving a multiplexed signal;
demultiplexing the multiplexed signal into a plurality of signals; and
detecting interference caused by another device in the multiplexed signal by referring to transitions in bit of the plurality of signals in a predetermined time period;
wherein, in the detecting, the interference is detected by referring to a frequency-of-occurrence of transitions in bit of any signal of the plurality of signals; and
wherein the detecting includes determining that the interference is detected in cases in which a first amount of time during which the frequency-of-occurrence remains higher than or equal to a threshold exceeds a shortest frame length in a predetermined protocol and in which the first amount of time is less than or equal to a longest frame length in the predetermined protocol, and in which a second amount of time during which the frequency-of-occurrence remains less than the threshold follows the first amount of time, the second amount of time being longer than or equal to a no-signal time period after a frame in the predetermined protocol.

7. The interference detection method according to claim 6, wherein:
the plurality of signals include a known signal, and
the detecting includes determining whether the interference is detected, based on not only the transitions in bit, but also a frequency-of-occurrence of cases in which the known signal is different in value from known values.

* * * * *